United States Patent
Lim et al.

(10) Patent No.: US 12,504,415 B2
(45) Date of Patent: Dec. 23, 2025

(54) CONTAMINANT ANALYSIS APPARATUS AND WATER QUALITY MONITORING SYSTEM

(71) Applicant: SAMSUNG ELECTRONICS CO., LTD., Suwon-si (KR)

(72) Inventors: Jiyun Lim, Seoul (KR); Eunju Park, Hwaseong-si (KR); Yeontae Kim, Suwon-si (KR); Jinho Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 919 days.

(21) Appl. No.: 17/659,695

(22) Filed: Apr. 19, 2022

(65) Prior Publication Data
US 2022/0365058 A1  Nov. 17, 2022

(30) Foreign Application Priority Data

May 14, 2021 (KR) .................. 10-2021-0062688
Aug. 20, 2021 (KR) .................. 10-2021-0110140

(51) Int. Cl.
*G01N 33/18* (2006.01)
*C02F 1/52* (2023.01)
(Continued)

(52) U.S. Cl.
CPC ........... *G01N 33/18* (2013.01); *C02F 1/5236* (2013.01); *C02F 1/54* (2013.01); *H04W 4/38* (2018.02)

(58) Field of Classification Search
CPC ......... G01N 33/18; C02F 1/5236; C02F 1/54; C02F 1/001; C02F 2103/346; C02F 2209/40; H04W 4/38
See application file for complete search history.

(56) References Cited

U.S. PATENT DOCUMENTS

| | | |
|---|---|---|
| 10,408,800 B2 | 9/2019 | Choi et al. |
| 2005/0165575 A1 | 7/2005 | Mettes |

(Continued)

FOREIGN PATENT DOCUMENTS

| | | |
|---|---|---|
| KR | 10-0562478 | 3/2006 |
| KR | 10-0896044 | 4/2009 |

(Continued)

OTHER PUBLICATIONS

Sui, et al., "Online ultrasonic nebulizer assisted laser induced breakdown spectroscopy (OUN-LIBS): An online metal elements sensor for marine water analysis", ScienceDirect, Spectrochimica Acta Part B: Atomic Spectroscopy 180 (2021) 106201, 11 pages.

(Continued)

*Primary Examiner* — Kathryn Elizabeth Limbaugh
(74) *Attorney, Agent, or Firm* — MORGAN, LEWIS & BOCKIUS LLP

(57) ABSTRACT

A real-time wastewater treatment and water quality monitoring system includes a plurality of wastewater treatment facilities configured to purify wastewater generated from semiconductor manufacturing lines, a plurality of contaminant analysis apparatuses configured to obtain and analyze a sample from effluent water discharged through discharge pipes of the wastewater treatment facilities respectively, discharge rate sensors installed in the discharge pipes respectively, and an integrated monitoring apparatus configured to receive measurement result values from the contaminant analysis apparatuses and the discharge rate sensors and monitor in real time concentration of a contaminant in an entirety of the effluent water that is purified and discharged from the wastewater generated in the semiconductor manufacturing lines.

20 Claims, 13 Drawing Sheets

(51) Int. Cl.
*C02F 1/54* (2023.01)
*H04W 4/38* (2018.01)

(56) References Cited

U.S. PATENT DOCUMENTS

| | | |
|---|---|---|
| 2017/0205382 A1 | 7/2017 | Choi et al. |
| 2019/0127247 A1* | 5/2019 | Sassaman, Jr. ......... C02F 1/722 |
| 2019/0383840 A1 | 12/2019 | Wiederin et al. |

FOREIGN PATENT DOCUMENTS

| | | |
|---|---|---|
| KR | 10-0955710 | 4/2010 |
| KR | 10-1033542 | 4/2011 |
| KR | 10-1035031 | 5/2011 |
| KR | 10-1114677 | 2/2012 |
| KR | 10-1507019 | 3/2015 |
| KR | 10-1507025 | 3/2015 |
| KR | 10-2015-0118314 | 10/2015 |
| KR | 10-1833003 | 2/2018 |
| KR | 10-2046330 | 11/2019 |
| KR | 10-2066930 | 1/2020 |
| KR | 10-2135191 | 7/2020 |
| KR | 10-2150683 | 8/2020 |

OTHER PUBLICATIONS

Gallart-Ayala, et al., "On-line solid phase extraction fast liquid chromatography-tandem mass spectrometry for the analysis of bisphenol A and its chlorinated derivatives in water samples", ScienceDirect, Journal of Chromatography A, 1217 (2010) 3511-3518.

Baek, et al., "Mobile Water Quality Monitoring System using Ion-Selective-Electrodes", Journal of The Institute of Electronics and Information Engineers vol. 55, No. 2, Feb. 2018, pp. 161-170.

Kim, "Water Quality Monitoring System with real time", The Institute of Electronics and Information Engineers, 2016.6, 1986-1988(3 pages).

* cited by examiner

CONTAMINANT ANALYSIS APPARATUS AND WATER QUALITY MONITORING SYSTEM

CROSS-REFERENCE TO RELATED APPLICATION(S)

This application claims priority under 35 U.S.C. § 119 to Korean Patent Application Nos. 10-2021-0062688 and 10-2021-0110140, filed on May 14, 2021 and Aug. 20, 2021, respectively, in the Korean Intellectual Property Office (KIPO), the contents of which are herein incorporated by reference in their entirety.

TECHNICAL FIELD

The present invention relates to a contaminant analysis apparatus and a water quality monitoring system, and more particularly, to a contaminant analysis apparatus configured to analyze contaminants in effluent water discharged through a discharge pipe from a semiconductor manufacturing line, and a real-time wastewater treatment and water quality monitoring system using the same.

DISCUSSION OF RELATED ART

A large amount of wastewater is generated by gases and chemicals used in semiconductor manufacturing processes, and in each of the semiconductor manufacturing lines, the wastewater must be purified through a wastewater treatment process before being safely discharged. Concentrations of contaminants in the effluent water are monitored. Ion components and metal components of the contaminants included in the effluent water are treated as major quality items and managed as periodic monitoring targets. However, since equipment for ion component analysis and equipment for metal component analysis are installed separately from each other, it is inefficient in facility space and maintenance, and there is a need to develop a real-time analysis facility that can respond rapidly in case of an accident is required.

SUMMARY

Example embodiments of the present invention provide a wastewater treatment and water quality monitoring system capable of purifying wastewater generated from semiconductor manufacturing lines and monitoring effluent water discharged therefrom in real time.

Example embodiments of the present invention provide a contaminant analysis apparatus capable of analyzing ion components and metal components of the effluent water together.

Example embodiments of the present invention provide a real-time water quality monitoring system using the contaminant analysis apparatus.

According to an example embodiment of the present invention, a real-time wastewater treatment and water quality monitoring system includes a plurality of wastewater treatment facilities configured to purify wastewater generated from semiconductor manufacturing lines, a plurality of contaminant analysis apparatuses configured to obtain and analyze a sample from effluent water discharged through discharge pipes of the wastewater treatment facilities respectively, discharge rate sensors installed in the discharge pipes respectively, and an integrated monitoring apparatus configured to receive measurement result values from the contaminant analysis apparatuses and the discharge rate sensors and monitor in real time concentration of a contaminant in an entirety of the effluent water that is purified and discharged from the wastewater generated in the semiconductor manufacturing lines.

According to an example embodiment of the present invention, a contaminant analysis apparatus includes a pre-processing sampler configured to collect and filter effluent water discharged through a discharge pipe of a wastewater treatment facility to provide an inspection target sample, a sample introducer having a sample supply valve configured to selectively introduce the inspection target sample from the pre-processing sampler and a reference sample from a reference sample supply, a sample injector configured to selectively supply the inspection target sample and the reference sample supplied from the sample introducer to a sample analysis line and including first and second sample loops configured to be filled with the inspection target sample and a switching valve configured to connect any one of the first and second sample loops to the sample analysis line and disconnect an other of the first and second sample loops from the sample analysis line, and an analyzer having an ion component analyzer and a metal component analyzer configured to respectively analyze an ion component and a metal component of the inspection target sample and the reference sample supplied through the sample analysis line.

According to an example embodiment of the present invention, a real-time wastewater treatment system includes a plurality of wastewater treatment facilities configured to purify wastewater generated from semiconductor manufacturing lines, and a plurality of contaminant analysis apparatuses configured to analyze contaminants in effluent water discharged through discharge pipes of the wastewater treatment facilities respectively. Each of the contaminant analysis apparatuses includes a pre-processing sampler configured to collect and filter the effluent water discharged through a corresponding one of the discharge pipes to provide an inspection target sample, a sample introducer having a sample supply valve configured to selectively introduce the inspection target sample from the pre-processing sampler and a reference sample from a reference sample supply to a sample line, a sample injector configured to selectively supply the inspection target sample and the reference sample supplied through the sample line to a sample analysis line, and an analyzer having an ion component analyzer and a metal component analyzer configured to respectively analyze an ion component and a metal component of the inspection target sample and the reference sample supplied through the sample analysis line.

According to an example embodiment of the present invention, a water quality monitoring system includes contaminant analysis apparatuses configured to analyze a contaminant within effluent water discharged through discharge pipes of a plurality of wastewater treatment facilities respectively, the wastewater treatment facilities being configured to purify wastewater generated from semiconductor manufacturing lines, discharge rate sensors installed in the discharge pipes respectively, and an integrated monitoring apparatus configured to receive measurement result values from the contaminant analysis apparatuses and the discharge rate sensors and monitor in real time concentration of the contaminant in an entirety of the effluent water discharged from the semiconductor manufacturing lines. The integrated monitoring apparatus includes a server configured to receive the result values measured by the contaminant analysis apparatuses and the discharge rate sensors through a wireless communication network, and a monitoring portion configured to calculate the concentration of the contaminant in the entirety of the effluent water discharged from the semiconductor manufacturing lines based on the result values stored in the server.

BRIEF DESCRIPTION OF THE DRAWINGS

Example embodiments of the present invention will be more clearly understood from the following detailed description taken in conjunction with the accompanying drawings, in which.

Figure 1:
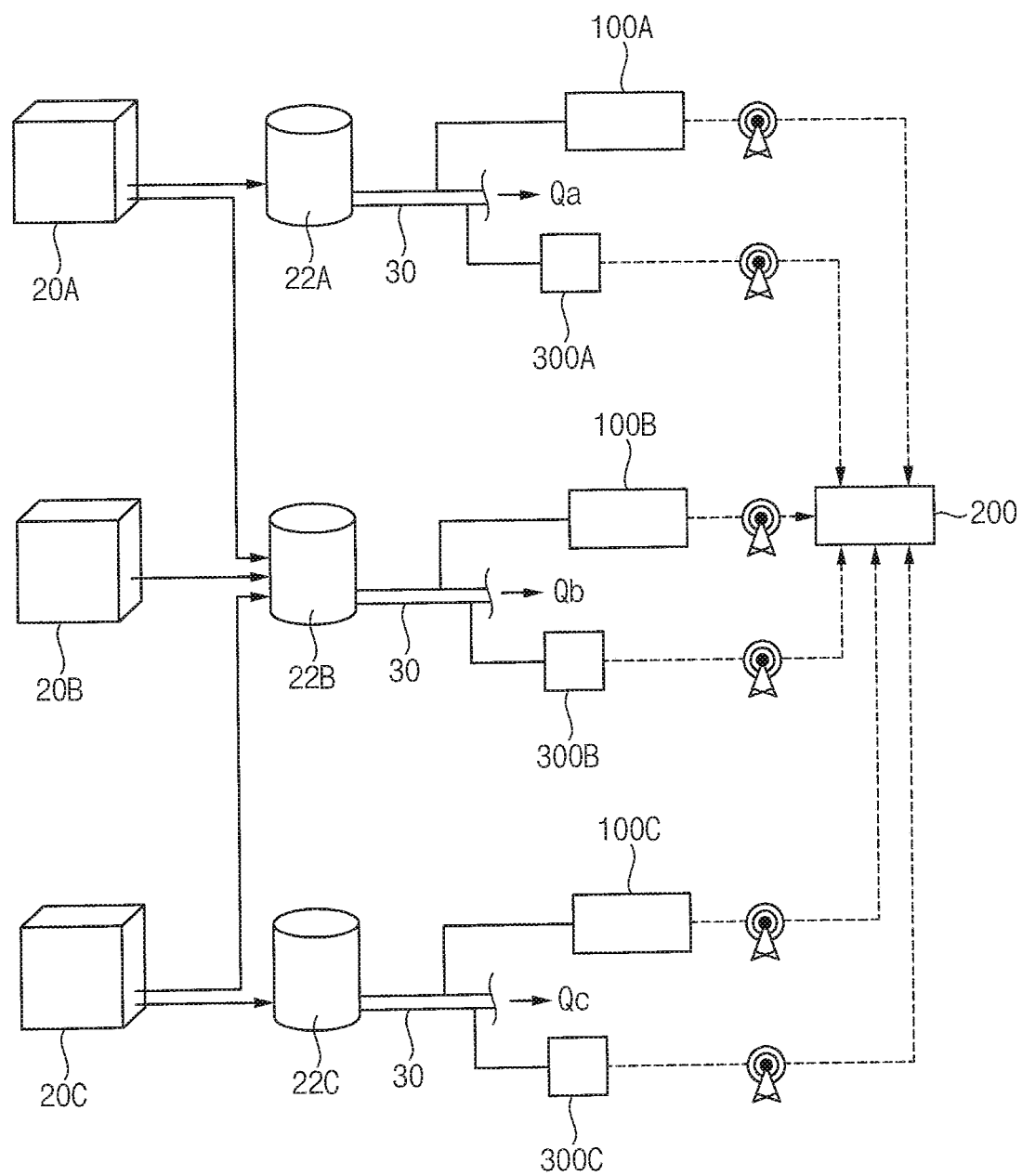
FIG. 1 is a block diagram illustrating a real-time wastewater treatment and water quality monitoring system in accordance with an example embodiment of the present invention.

Since the drawings in FIGS. 1-10 are intended for illustrative purposes, the elements in the drawings are not necessarily drawn to scale. For example, some of the elements may be enlarged or exaggerated for clarity purpose.

DETAILED DESCRIPTION OF THE EMBODIMENTS

Hereinafter, example embodiments of the present invention will be explained in detail with reference to the accompanying drawings.

Figure 2:
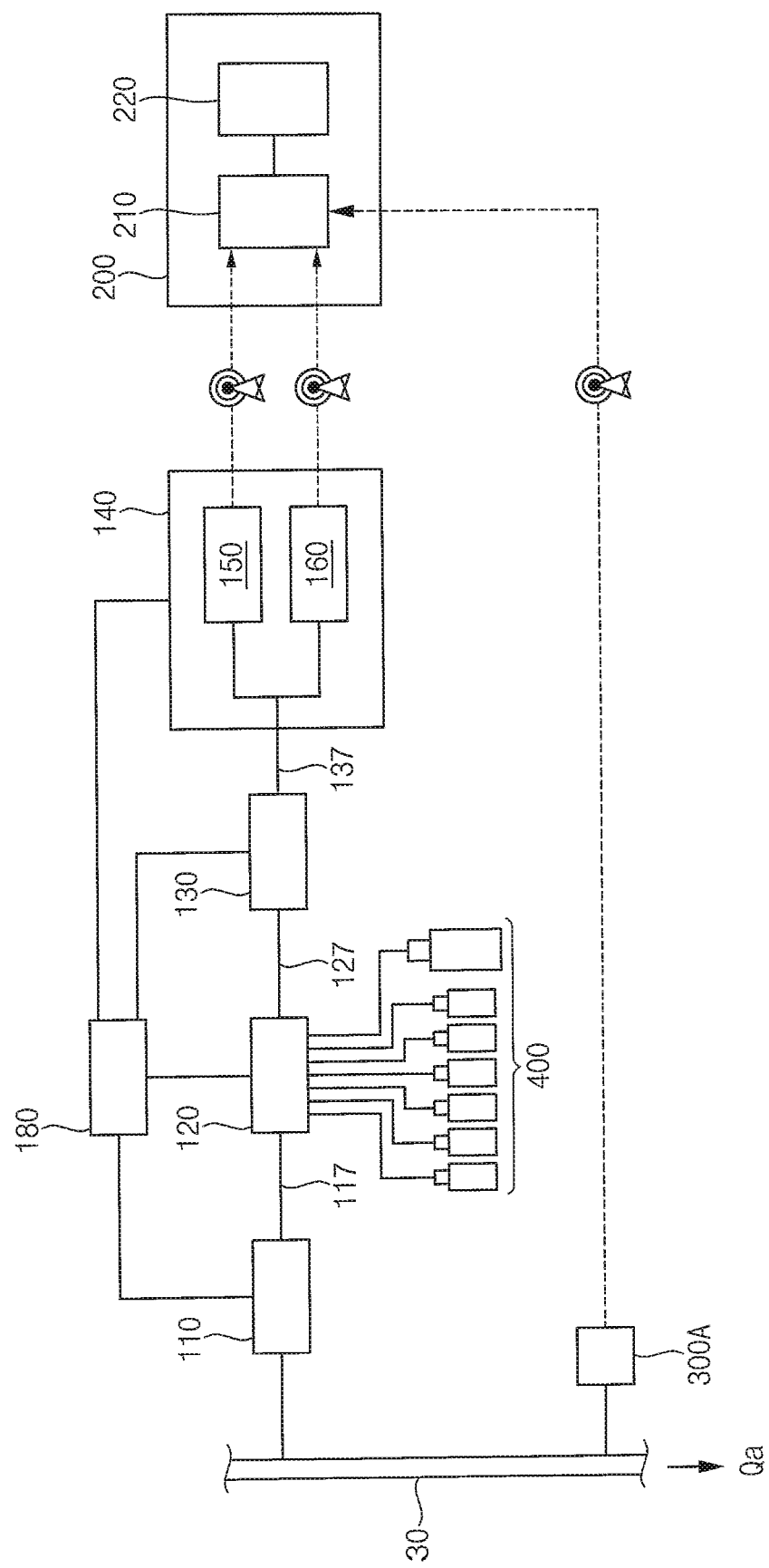
FIG. 2 is a block diagram illustrating an individual contaminant analysis apparatus in FIG. 1.

FIG. 1 is a block diagram illustrating a real-time wastewater treatment and water quality monitoring system in accordance with an example embodiment of the present invention. FIG. 2 is a block diagram illustrating an individual contaminant analysis apparatus in FIG. 1.

Referring to FIGS. 1 and 2, a real-time wastewater treatment and water quality monitoring system 10 may include a plurality of wastewater treatment facilities 22A, 22B and 22C configured to purify wastewater generated from semiconductor manufacturing lines 20A, 20B and 20C, contaminant analysis apparatuses 100A, 100B and 100C configured to analyze contaminants in effluent water discharged from the plurality of wastewater treatment facilities 22A, 22B and 22C, respectively, and an integrated monitoring apparatus 200 configured to receive measurement results from the contaminant analysis apparatuses 100A, 100B and 100C and monitor concentration of the contaminant in the total effluent water discharged from the semiconductor manufacturing lines 20A, 20B and 20C in real time. The real-time wastewater treatment and water quality monitoring system 10 may further include discharge rate sensors 300A, 300B and 300C installed respectively in discharge pipes 30 of the wastewater treatment facilities 22A, 22B and 22C. The integrated monitoring apparatus 200 may also be configured to receive measurement results from the discharge rate sensors 300A, 300B and 300C.

In an example embodiment of the present invention, a large amount of wastewater may be generated in the semiconductor manufacturing lines 20A, 20B and 20C by gases, chemicals, etc. used in manufacturing processes, and the wastewater generated from each of the semiconductor manufacturing lines 20A, 20B and 20C may be collected by the plurality of wastewater treatment facilities 22A, 22B and 22C and may be purified through purification treatment processes therein. For example, the wastewater generated from each of the semiconductor manufacturing lines 20A, 20B and 20C often contains high levels of ions, metals and organic pollutants, and the purification treatment processes may remove or reduce these contaminants. The effluent water purified by the purification treatment processes may be discharged through the discharge pipes 30 of the wastewater treatment facilities 22A, 22B and 22C, and the contaminant analysis apparatuses 100A, 100B and 100C may obtain and analyze samples from the effluent water discharged through the discharge pipes 30 of the wastewater treatment facilities 22A, 22B and 22C.

After the wastewater generated in the semiconductor manufacturing lines 20A, 20B and 20C is collected into wastewater tanks of the wastewater treatment facilities 22A, 22B and 22C, respectively, the wastewater may be purified through purification treatment processes therein. The purified water purified by the purification treatment processes may be collected into a discharge water tank and then may be discharged through the discharge pipe 30.

The wastewater collected into the wastewater tank may be purified by an inorganic primary treatment process, an organic treatment process, and an inorganic secondary treatment process. In the inorganic primary treatment process, pH may be adjusted through a chemical treatment using a chemical agent, and sediments in the wastewater may be removed. For example, a pH meter may be used to monitor the reaction of the contaminant to be removed with the chemical agent, and the pH information may be used to drive a rate of introducing the chemical agent to the wastewater to be purified. The contaminant to be removed may react with the chemical agent to form sediments. In the organic treatment process, organic substances may be removed from the wastewater using microorganisms. For example, in many instances, the microorganisms may not only remove organic substances from the water, but also precipitate out as a solid material for easy removal. In the inorganic secondary treatment process, pH may be adjusted to satisfy a desired specification through chemical treatment using a chemical agent.

The semiconductor manufacturing lines 20A, 20B and 20C may be connected to some specific facilities of the wastewater treatment facilities 22A, 22B and 22C according to facility characteristics of each manufacturing line and materials to be treated for purification. The wastewater generated in each of the semiconductor manufacturing lines 20A, 20B and 20C may be supplied to at least one of the wastewater treatment facilities 22A, 22B and 22C. For example, the wastewater generated in the first semiconductor manufacturing line 20A may be supplied to the first and second wastewater treatment facilities 22A and 22B. The wastewater generated in the second semiconductor manufacturing line 20B may be supplied to the second wastewater treatment facility 22B. The wastewater generated in the third semiconductor manufacturing line 20C may be supplied to the second and third wastewater treatment facilities 22B and 22C. It will be understood that the connection relationship between the semiconductor manufacturing lines 20A, 20B and 20C and the wastewater treatment facilities 22A, 22B and 22C is exemplary and not limited thereto.

Each of the contaminant analysis apparatuses 100A, 100B and 100C may include a pre-processing sampler 110, a sample introducer 120, a sample injector 130 and an analyzer 140. The integrated monitoring apparatus 200 may include a server 210 and a monitoring portion 220.

The contaminant analysis apparatuses 100A, 100B and 100C may each include components, such as pumps, valves, tubing, sensors, etc., suitable for acquiring a sample to be analyzed (inspection target sample) from the effluent water discharged through the discharge pipes 30 and a reference sample from a reference sample supply 400 and delivering any one of the acquired samples to the analyzer 140. Additionally, each of the contaminant analysis apparatuses 100A, 100B and 100C may further include a controller 180 configured to control operations of the components such as the pumps, the valve, etc. In an example embodiment of the present invention, each of the contaminant analysis apparatuses 100A, 100B and 100C may include one or more pumps to effectively move the inspection target sample and the reference sample to the analyzer 140. For example, a syringe pump may be used to effectively move the inspection target sample and the reference sample to the analyzer 140, but the present invention is not limited thereto. For example, any other type of pump capable of effectively moving fluid may be used.

Each of the contaminant analysis apparatuses 100A, 100B and 100C may include the multi-stage filter type pre-processing sampler 110. For example, the pre-processing sampler 110 may contain various filters, with different filter media and/or pore size in each to tackle multiple filtration tasks. The pre-processing sampler 110 may supply the inspection target sample filtered from the effluent water to the sample introducer 120 through an inspection target sample line 117. The pre-processing sampler 110 may remove suspended substances in the effluent water discharged from the wastewater purification treatment facility, and may prevent clogging in the analysis device through filtering suitable for the analysis facility and reduce the maintenance cost for the sample pipe. For example, by installing multiple stages of filtration, such as from coarse to fine, in the pre-processing sampler 110, it may increase the efficacy of removing particles and avoid clogging in the analysis device.

The sample introducer 120 of each of the contaminant analysis apparatuses 100A, 100B and 100C may select and supply one of the inspection target sample filtered by the pre-processing sampler 110 and the reference sample from the reference sample supply 400 to the sample injector 130 through the sample line 127. The sample injector 130 of each of the contaminant analysis apparatuses 100A, 100B and 100C may supply the sample supplied from the sample introducer 120 to the analyzer 140 through a sample analysis line 137. As will be described later, each of the contaminant analysis apparatuses 100A, 100B and 100C may re-verify hunting data of the real-time analysis facility through the dual sample loop type sample injector 130. Here, the hunting data may mean a case in which monitored data bounces beyond a reference value. In other words, for each of the contaminant analysis apparatuses 100A, 100B and 100C, monitored data being out of an allowable range may be re-verified.

The analyzer 140 of each of the contaminant analysis apparatuses 100A, 100B and 100C may include an ion component analyzer 150 as a first analyzer for detecting ion components of the contaminants included in the effluent water (e.g., the sample supplied from the sample introducer 120 to the analyzer 140 through the sample analysis line 137), and a metal component analyzer 160 as a second analyzer for detecting metal components of the contaminants. Accordingly, each of the contaminant analysis apparatuses 100A, 100B and 100C may analyze simultaneously the ion component and the metal component of the contaminants contained in the effluent water, thereby enhancing space efficiency and operational efficiency.

The first to third discharge rate sensors 300A, 300B and 300C may be installed in the discharge pipes 30 of the wastewater treatment facilities 22A, 22B and 22C, respectively, to measure flow rates Qa, Qb, and Qc, respectively, of the effluent water discharged through the discharge pipes 30.

The integrated monitoring apparatus 200 may receive result values analyzed by the contaminant analysis apparatuses 100A, 100B and 100C. As will be described later, a server 210 of the integrated monitoring apparatus 200 may receive and store the analysis result values from the contaminant analysis apparatuses 100A, 100B and 100C through wireless communication. For example, the server 210 of the integrated monitoring apparatus 200 may receive and store the analysis result values from the ion component analyzer 150 and the metal component analyzer 160 of each of the contaminant analysis apparatuses 100A, 100B and 100C. In addition, the server 210 of the integrated monitoring apparatus 200 may receive and store the flow rate values Qa, Qb, and Qc measured from the first to third discharge rate sensors 300A, 300B and 300C through wireless communication. The monitoring portion 220 of the integrated monitoring apparatus 200 may calculate the concentrations of the contaminants in the total effluent water that is purified and discharged from the wastewater generated in the semiconductor manufacturing lines 20A, 20B, and 20C based on the analysis result values. Since the concentrations of the contaminants in the total effluent water that is purified can be calculated by the monitoring portion 220 of the integrated monitoring apparatus 200 and monitored, the information can be used to control the purification process so as to meet the discharge limits of the contaminants.

Hereinafter, the pre-processing sampler 110 of each of the contaminant analysis apparatuses 100A, 100B and 100C will be explained.

Figure 3:
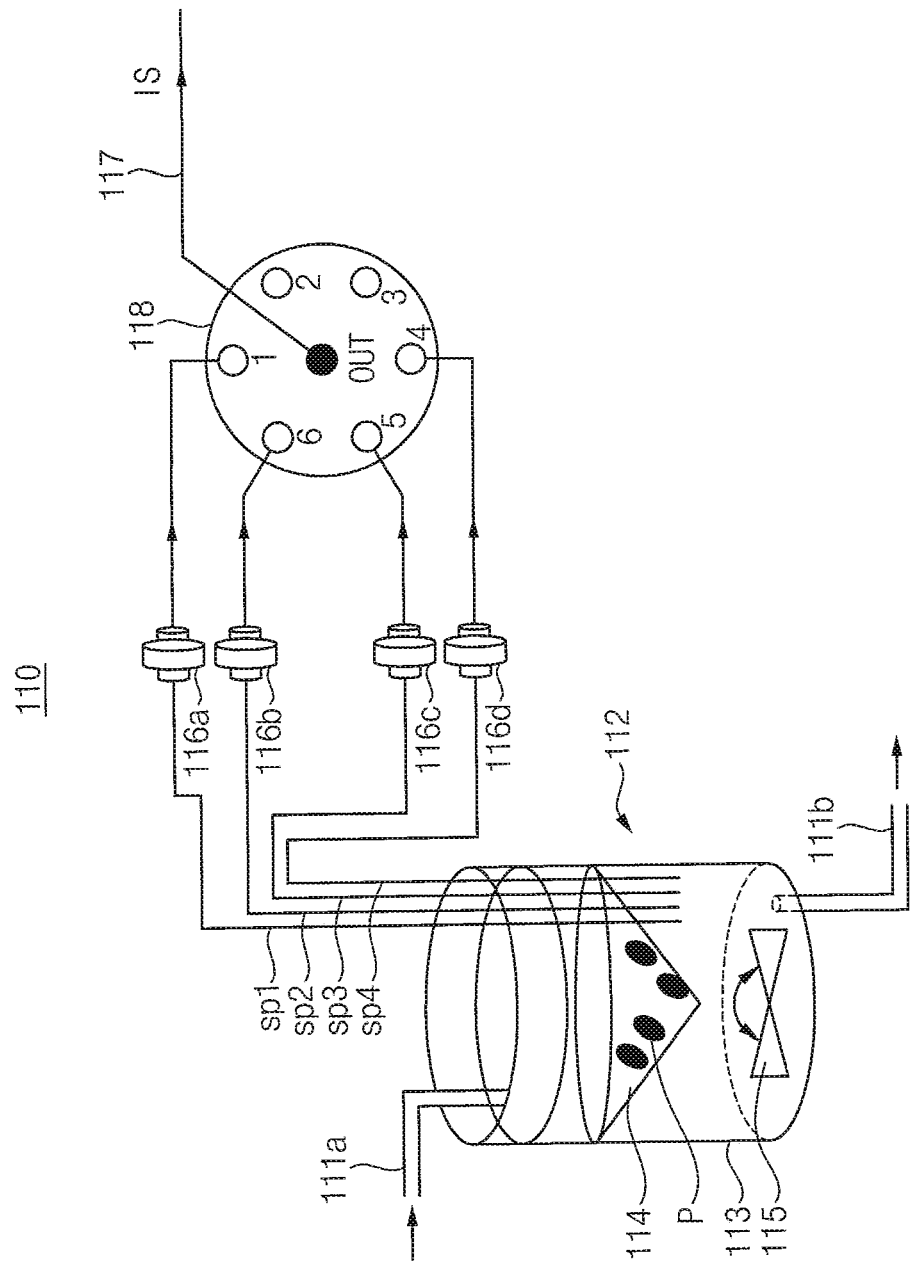
FIG. 3 is a view illustrating a pre-processing sampler of the contaminant analysis apparatus of FIG. 2.
Figure 4:
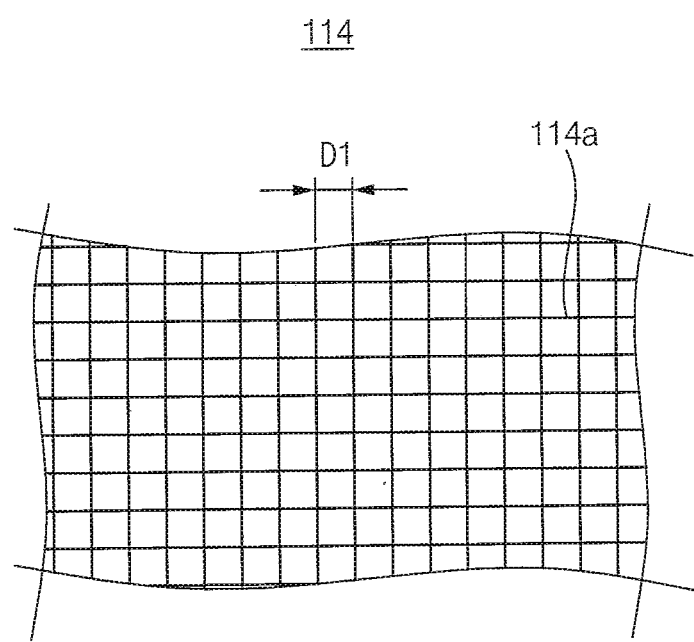
FIG. 4 is a plan view illustrating a portion of a first filter of FIG. 3.

FIG. 3 is a view illustrating a pre-processing sampler 110 of the contaminant analysis apparatus of FIG. 2. FIG. 4 is a plan view illustrating a portion of a first filter of FIG. 3.

Referring to FIGS. 3 and 4, a pre-processing sampler 110 may include a sampling box 112 having a first filter 114 for removing a suspended material Pin effluent water.

In an example embodiment of the present invention, the sampling box 112 may include a container 113 having a cylindrical shape for receiving the effluent water. A sampling inlet tube 111a may be in fluid communication with a discharge pipe or a discharge water tank to introduce the effluent water discharged therefrom into the sampling box 112. For example, the effluent water received by the container 113 from each of the discharge pipes 30 or the discharge water tanks may have been purified by the purification treatment processes performed in each of the wastewater treatment facilities 22A, 22B and 22C. The effluent water in the sampling box 112 may be discharged back to the discharge pipe 30 or the discharge water tank through a sampling outlet tube 111b. The sampling inlet tube 111a may be installed in an upper portion of the sampling box 112, and the sampling outlet tube 111b may be installed in a lower portion of the sampling box 112. By adjusting an inflow rate and an outflow rate into/out of the sampling box 112 through the sampling inlet tube 111a and the sampling outlet tube 111b, a circulation rate of the effluent water in the sampling box 112 may be adjusted.

The first filter 114 may be disposed in the sampling box 112 to filter the suspended material P in the effluent water introduced into the sampling box 112. The pre-processing sampler 110 may be a multi-stage filter type, and the first filter 114 may be a stage 1 filter for filtering larger particles such as the suspended material P. The first filter 114 may have a V-shaped bag type bag structure. A stirrer 115 may be provided in the sampling box 112 to stir and circulate the effluent water in the sampling box 112. The stirrer 115 may be, for example, a propeller type or a magnet type stirrer. Accordingly, the effluent water in the sampling box 112 may pass through the first filter 114 having the bag structure to filter the suspended material P in the effluent water. Accordingly, the suspended material P may be easily separated by the first filter 114, and the effluent water in the sampling box 112 may maintain the same concentration for each of the contaminants.

As illustrated in FIG. 4, the first filter 114 may include a strainer 114a having a mesh structure. A pore of the strainer 114a may have a first diameter D1 of 70 μm or more. Accordingly, the first filter 114 may filter the suspended material having a pore size of about 70 μm or less to prevent clogging in a sample port. The first filter 114 may include, for example, polyethylene (PE), nylon, polyester, etc.

In an example embodiment of the present invention, the pre-processing sampler 110 may include a multi-port valve 118 for supplying the effluent water filtered by the first filter 114 as an inspection target sample IS.

The multi-port valve 118 may be in fluid communication with first to fourth sampling port lines SP1, SP2, SP3 and SP4 for supplying the effluent water in the sampling box 112. The first to fourth sampling port lines SP1, SP2, SP3 and SP4 may extend from bottom to top of the first filter 114 in the sampling box 112 respectively to be connected to ports of the multi-port valve 118. End portions of the first to fourth sampling port lines SP1, SP2, SP3 and SP4 may be positioned below the first filter 114 in the sampling box 112. By an operation of the multi-port valve 118, the inspection target sample IS may be transferred to the inspection target sample line 117 through any one selected from the first to fourth sampling port lines SP1, SP2, SP3 and SP4.

In an example embodiment of the present invention, the pre-processing sampler 110 may further include at least one of the second filters 116a, 116b, 116c or 116d for secondarily filtering the effluent water supplied from the sampling box 112. The pre-processing sampler 110 may be a multi-stage filter type, and the second filters 116a, 116b, 116c and 116d may each be a stage 2 filter for filtering smaller particles. The second filters 116a, 116b, 116c and 116d may be installed in the first to fourth sampling port lines SP1, SP2, SP3 and SP4, respectively.

A pore of the second filters 116a, 116b, 116c and 116d may have a second diameter of about 0.45 μm to about 5 μm. The second filters 116a, 116b, 116c and 116d may include a filter suitable for the sample matrix material. The suitable filter included in the second filters 116a, 116b, 116c and 116d may be a cartridge type, but the present invention is not limited thereto. The second filters 116a, 116b, 116c and 116d may each include, for example, polytetrafluoroethylene (PTFE), polyvinylidene fluoride (PVDF), polyethersulfone (PES), etc.

Figure 5:
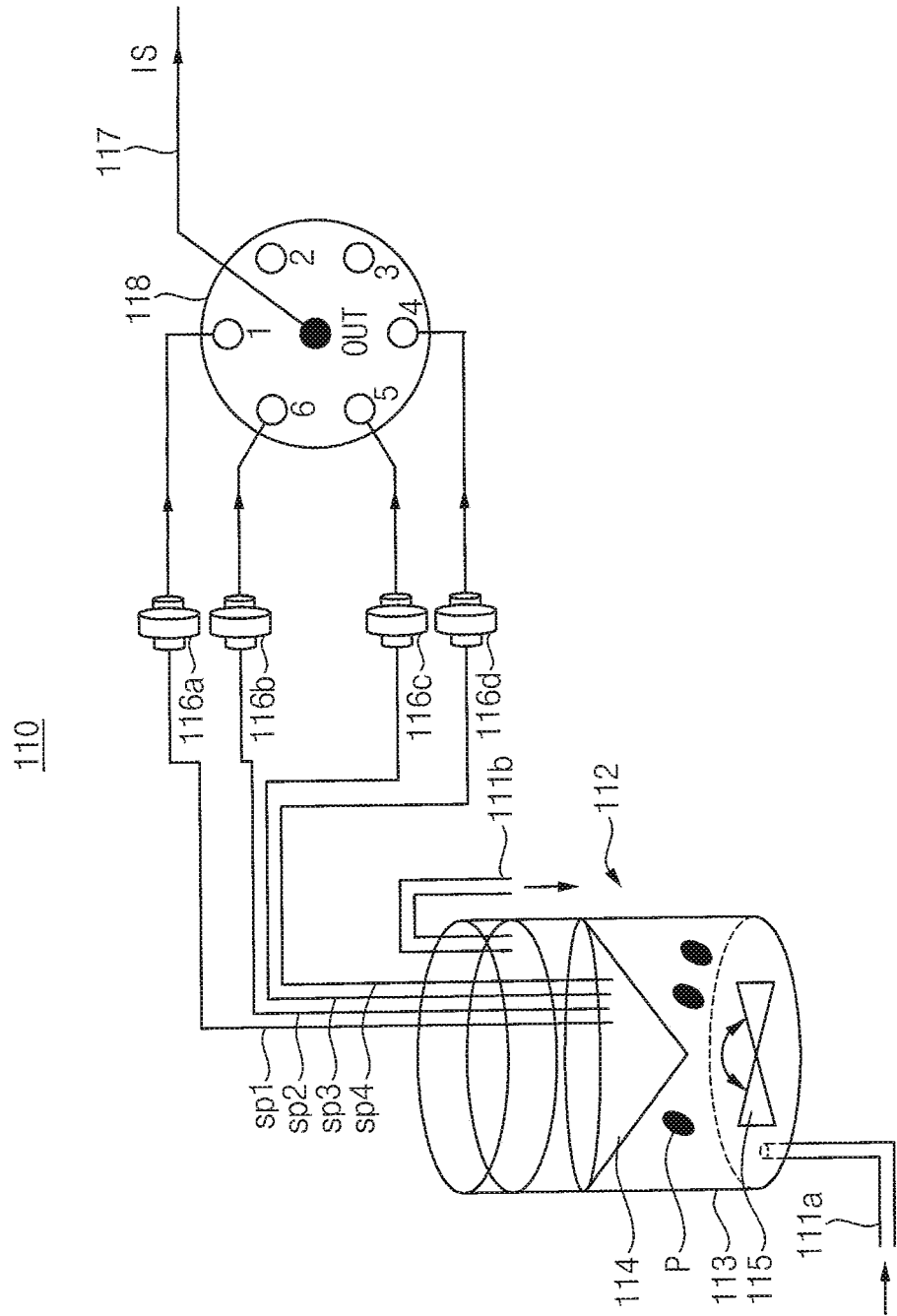
FIG. 5 is a view illustrating a modified example of the sampling box in FIG. 3 according to an example embodiment of the present invention.

FIG. 5 is a view illustrating a modified example of the sampling box in FIG. 3 according to an example embodiment of the present invention.

Referring to FIG. 5, a sampling inlet tube 111a may be installed in a lower portion of the sampling box 112, and a sampling outlet tube 111b may be installed in an upper portion of the sampling box 112. The sampling inlet tube 111a may be in fluid communication with the discharge pipe 30 or the discharge water tank to introduce the effluent water discharged therefrom into the sampling box 112. The effluent water in the sampling box 112 may be discharged back to the discharge pipe 30 or the discharge water tank through the sampling outlet tube 111b.

End portions of first to fourth sampling port lines SP1, SP2, SP3 and SP4 may be positioned above the first filter 114 in the sampling box 112. The end portions of the first to fourth sampling port lines SP1, SP2, SP3 and SP4 may be connected to ports of the multi-port valve 118 respectively. By an operation of the multi-port valve 118, the inspection target sample IS may be transferred to the inspection target sample line 117 through any one selected from the first to fourth sampling port lines SP1, SP2, SP3 and SP4.

Hereinafter, the sample introducer 120 and the sample injector 130 of each of the contaminant analysis apparatuses 100A, 100B and 100C will be described.

Figure 6:
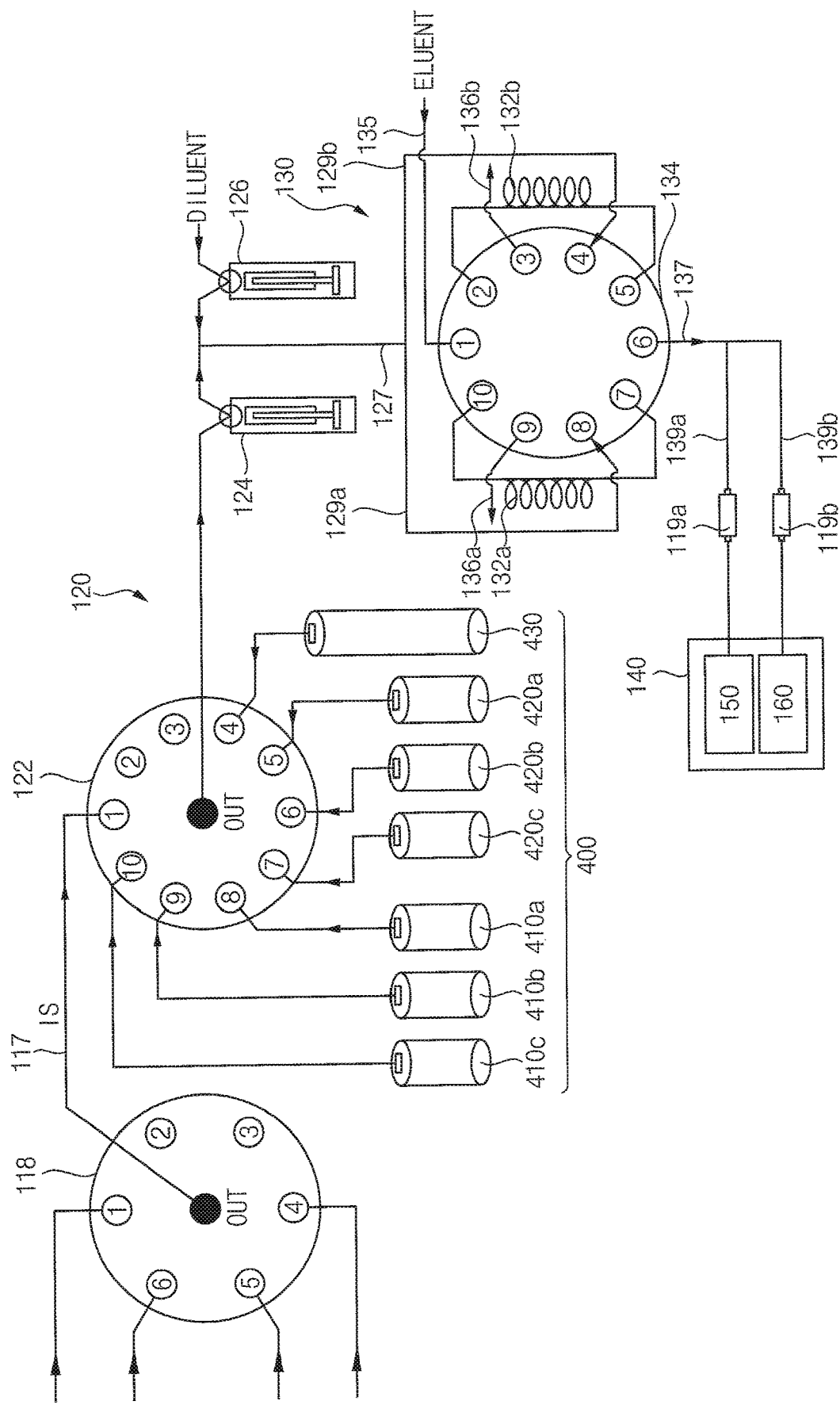
FIG. 6 is a view illustrating a sample introducer and a sample injector of the contaminant analysis apparatus of FIG. 2.
Figure 7:
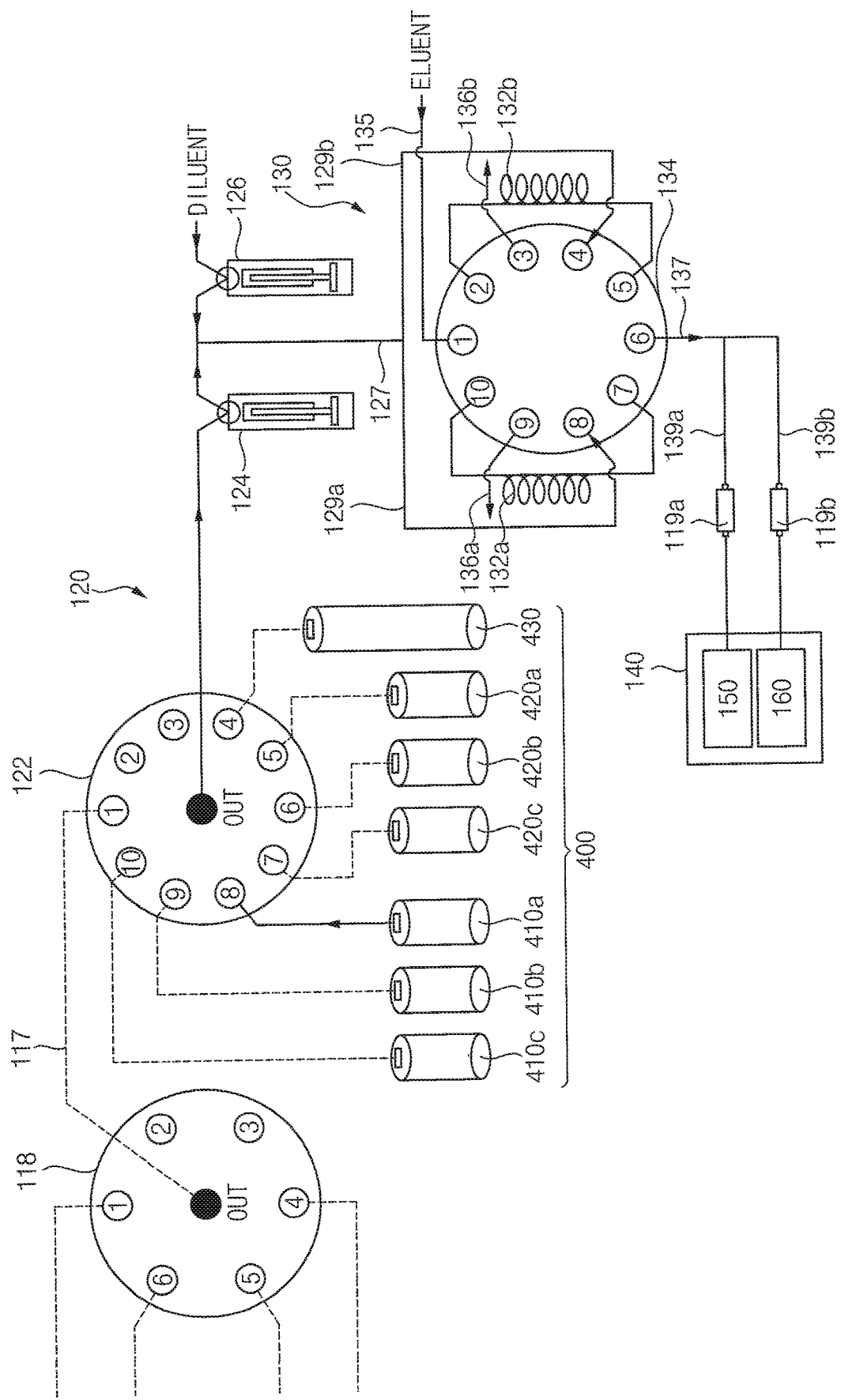
FIG. 7 is a view illustrating a path through which a first standard material sample is supplied, in the sample introducer and the sample injector in FIG. 6.
Figure 8:
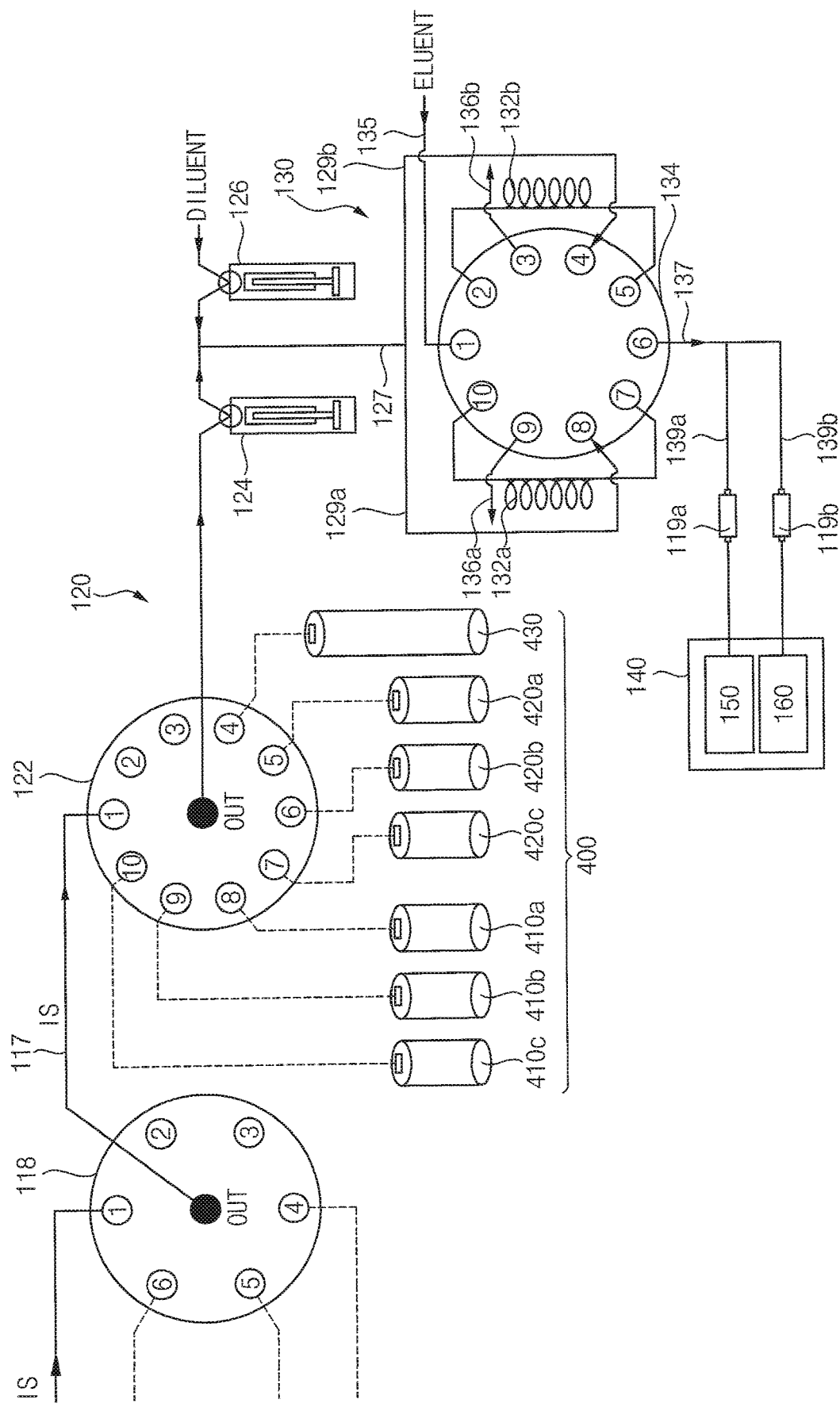
FIG. 8 is a view illustrating a path through which an inspection target sample is supplied, in the sample introducer and the sample injector in FIG. 6.

FIG. 6 is a view illustrating a sample introducer and a sample injector of the contaminant analysis apparatus of FIG. 2. FIG. 7 is a view illustrating a path through which a first standard material sample is supplied, in the sample introducer and the sample injector in FIG. 6. FIG. 8 is a view illustrating a path through which an inspection target sample is supplied, in the ample introducer and the sample injector in FIG. 6.

Referring to FIGS. 6 to 8, a sample introducer 120 may include a sample supply valve 122 that is in fluid communication with the pre-processing sampler 110 and the reference sample supply 400 to selectively supply the inspection target sample (IS) and the reference sample (STD, QC) to the sample injector 130 through the sample line 127. The reference sample (STD, QC) supplied by the reference sample supply 400 may be described later as a standard material sample (STD). The sample injector 130 may be a dual sample loop type, and may include first and second sample loops 132a and 132b configured to be filled with the inspection target sample (IS) and the reference sample (STD, QC) supplied from the sample supply valve 122 and a valve assembly having a switching valve 134 that is configured to connect any one of the first and second sample loops 132a and 132b to the sample analysis line 137 and disconnect the other of the first and second sample loops 132a and 132b from the sample analysis line 137.

In an example embodiment of the present invention, the sample supply valve 122 may be connected to the pre-processing sampler 110, the reference sample supply 400 and the sample injector 130. The sample supply valve 122 may supply any one of the inspection target sample (IS) from the pre-processing sampler 110 and the reference sample (STD, QC) from the reference sample supply 400 to the sample injector 130 through the sample line 127. At least one syringe pump 124 may be provided in the sample line 127 to supply the inspection target sample (IS) and the reference sample (STD, QC) to the sample injector 130. The syringe pump 124 may provide pressure to flow the sample from the sample supply valve 122 to the analyzer 140 via the sample injector 130.

The sample supply valve 122 may include a switching valve having a plurality of positions that selects a source of the sample to be analyzed by the analyzer 140. In this embodiment, although a 10-port valve having 10 ports is used, the present invention is not limited thereto. For example, the sample supply valve 122 may have 9 ports or less, or 11 ports or more.

A first port of the sample supply valve 122 may be connected to the inspection target sample line 117. Eighth to tenth ports of the sample supply valve 122 may be respectively connected to first to third standard material supplies 410a, 410b and 410c through reference sample supply lines. Fifth to seventh ports of the sample supply valve 122 may be respectively connected to fourth to sixth standard material supplies 420a, 420b and 420c through reference sample supply lines. A fourth port of the sample supply valve 122 may be connected to a certified standard material supply 430 through a reference sample supply line. The second and third ports of the sample supply valve 122 may not be directly connected to any of the inspection target sample line 117, the sample line 127 and the reference sample supply lines, but the present invention is not limited thereto.

The first to third standard material supplies 410a, 410b and 410c may provide a reference material sample for obtaining calibration curves for ion component analysis. The fourth to sixth standard material supplies 420a, 420b and 420c may provide a reference material (RM) sample for obtaining calibration curves for metal component analysis. The certified standard material supply 430 may provide a sample of a certified reference material.

The sample introducer 120 may further include at least one syringe pump 126 configured to supply a diluent to the sample line 127. The syringe pump 126 may mix the diluent with the sample flowing along the sample line 127 and may provide pressure to flow the diluted sample to the analyzer 140 via the sample injector 130. For example, ultra pure water (UPW) may be used as the diluent. The sample flowing along the sample line 127 may include the inspection target sample (IS) or the reference sample (STD, QC).

In an example embodiment of the present invention, the first sample loop 132a and the second sample loop 132b of the valve assembly are in fluid communication with the switching valve 134, and the first sample loop 132a and the second sample loop 132b may be fluidly connected to or disconnected from the first and second sample supply lines 129a and 129b branched from the sample line 127, respectively, depending on an operating position of the switching valve 134. For example, the operation position of the switching valve 134 may determine the fluid connection or the fluid disconnection between the first sample loop 132a and the first sample supply line 129a, and between the second sample loop 132b and the second sample supply line 129b.

The first and second sample loops 132a and 132b may have various shapes and structures, such as, for example, a coil, a vessel, etc., to receive an amount of the sample suitable for the ion analysis and the metal analysis. The first and second sample loops 132a and 132b may be referred to as, for example, a coiled fluid line, a straight fluid line, a curved fluid line, a reservoir or other structure having a defined volume for holding and delivering a fluid.

The switching valve 134 may include a multi-port valve. The multi-port valve may include a rotary having a plurality of ports for connecting or disconnecting the first and second sample loops 132a and 132b respectively between the first and second sample supply lines 129a and 129b and the sample analysis line 137, and a driving portion having a rotary driver such as a motor, etc., for rotating the rotary to change the path of the sample.

The switching valve 134 may be, for example, a 10-port 2-position valve. In this case, the switching valve 134 may include a first port to which an eluent supply line 135 is connected, an eighth port to which a first sample supply line 129a is connected, a fourth port to which a second sample supply line 129b is connected, a seventh port and a tenth port to which both end portions of the first sample loop 132a are respectively connected, a second port and a fifth port to which both end portions of the second sample loop 132b are respectively connected, a ninth port to which a first sample drain line 136a is connected, a third port to which a second sample drain line 136b is connected, and a sixth port to which the sample analysis line 137 is connected.

In an example embodiment of the present invention, the sample injector 130 may further include an eluent supply that provides an eluent having a moving phase. The eluent supply unit is an eluent storage portion for storing the eluent, and a pump such as a syringe pump that extracts the eluent from the eluent storage portion and moves it to the analyzer 140 through the sample analysis line 137 via the switching valve 134. For example, the syringe pump may extract the eluent from the eluent supply unit to enter the first port of the switching valve 134, and the eluent may elute the inspection target sample (IS) or the reference sample (STD, QC) and exit the sixth port of the switching valve 134 to the analyzer 140 through the sample analysis line 137.

The eluent may serve as a moving phase solvent to form a multi-component mixed solution together with the sample. Examples of the eluent may be an eluent used in a general ion analyzer such as, for example, ultra pure water (UPW), a carbonate solution, a hydroxide solution, etc. The pump may deliver the eluent from the eluent storage portion and may provide pressure so that the eluent flows through the switching valve 134 and the analyzer 140. Accordingly, the pump may provide a constant pressure so that the eluent flows inside the analyzer 140 at a constant flow rate.

As illustrated in FIG. 7, in a first operation position of the sample supply valve 122, the sample supply valve 122 may be connected to the first standard material supply 410a through the reference sample supply line to supply a first standard material sample STD #1 to the ion component analyzer 150 of the analyzer 140 through the sample supply valve 122 and the sample injector 130.

At least any one of the first and second sample loops 132a and 132b of the sample injector 130 may be filled with the first standard material sample STD #1 supplied from the first standard material supply 410a through the sample introducer 120. The first standard material sample STD #1 filled in the at least any one of the first and second sample loops 132a and 132b may be injected into the ion component analyzer 150 of the analyzer 140 to perform ion component analysis.

Similarly, the sample supply valve 122 may be connected to the second standard material supply 410b to supply a second standard material sample STD #2 to the ion component analyzer 150 of the analyzer 140 through the sample supply valve 122 and the sample injector 130 for ion component analysis. Also, the sample supply valve 122 may be connected to the third standard material supply 410c to supply a third standard material sample STD #3 to the ion component analyzer 150 of the analyzer 140 through the sample supply valve 122 and the sample injector 130 for ion component analysis.

The sample supply valve 122 may be connected to the fourth to sixth standard material supplies 420a, 420b and 420c to supply the fourth to sixth standard material samples STD #4, STD #5 and STD #6 to the metal component analyzer 160 of the analyzer 140 through the sample supply valve 122 and the sample injector 130.

At least any one of the first and second sample loops 132a and 132b of the sample injector 130 may be filled with fourth to sixth standard material samples STD #4, STD #5 and STD #6 supplied from the fourth to sixth standard material supplies 420a, 420b and 420c through the sample introducer 120. The fourth to sixth standard material samples STD #4, STD #5 and STD #6 filled in the at least any one of the first and second sample loops 132a and 132b may be injected into the metal component analyzer 160 of the analyzer 140 to perform metal component analysis.

As illustrated in FIG. 8, in a second operation position of the sample supply valve 122, the sample supply valve 122 may be connected to the inspection target sample line 117 to simultaneously supply the inspection target sample (IS) to the ion component analyzer 150 and the metal component analyzer 160 of the analyzer 140 through the sample supply valve 122 and the sample injector 130 to perform ion component analysis and metal component analysis.

The first and second sample loops 132a and 132b of the sample injector 130 may be filled with the inspection target sample (IS) supplied from the pre-processing sampler 110 through the sample introducer 120 respectively. When the inspection target sample IS #1, which may be, for example, referred to as the first inspection target sample, filled in any one of the first and second sample loops 132a and 132b may be injected into the ion component analyzer 150 and the metal component analyzer 160 of the analyzer 140 to perform component analysis, the inspection target sample IS #2, which may be, for example, referred to as the second inspection target sample, filled in the other of the first and second sample loops 132a and 132b may be retained therein without being discharged to the outside. The first and second inspection target samples IS #1 and IS #2 may include the same material. When the component analysis result value (measured concentration value) of the first inspection target sample IS #1 is greater than or equal to a reference value (out of an allowable range), the second inspection target sample IS #2 retained in the other one may be injected into the ion component analyzer 150 and the metal component analyzer 160 to perform component analysis again to verify the hunting data. The component analysis may be performed again on the second inspection target sample IS #2, which includes the same material as the first inspection target sample IS #1, to determine whether the hunting data is false data due to an analysis facility error. In an example embodiment of the present invention, when the component analysis is performed on the second inspection target sample IS #2, the any one of the first and second sample loops 132a and 132b may not be filled with a new inspection target sample.

In an example embodiment of the present invention, first and second sample analysis lines 139a and 139b branched from the sample analysis line 137 may be in fluid communication with the ion component analyzer 150 and the metal component analyzer 160, respectively. Third filters 119a and 119b may be installed in the first and second sample analysis lines 139a and 139b, respectively. The third filters 119a and 119b may constitute a multi-stage filtering system together with the first filter 114 and the second filters 116a, 116b, 116c and 116d. For example, the first filter 114 may be a stage 1 filter, the second filters 116a, 116b, 116c and 116d may each be a stage 2 filter, and the third filters 119a and 119b may each be a stage 3 filter. Accordingly, the pore size of the third filters 119a and 119b may be smaller than the pore size of the second filters 116a, 116b, 116c and 116d.

A pore of the third filters 119a and 119b may each have a third diameter of about 0.2 μm to about 0.45 μm. For example, the third filters 119a and 119b may each include inorganic fibers. The third filters 119a and 119b may each be installed upstream of the analyzer 140 to prevent inflow of fine particles into a column of the analyzer 140.

In an example embodiment of the present invention, the ion component analyzer 150 may perform ion component analysis by an ion chromatography technique. The ion component analyzer 150 may include a separation column and a detector. A sample including ion components dissolved therein may move to the separation column through the first sample analysis line 139a to be separated according to ion components in the separation column, and then an electric conductivity with respect to ion concentration may be measured in the detector to perform qualitative and quantitative analysis on each ion component. The ion components detected by the ion component analyzer 150 through the ion chromatography technique may be inorganic anions and cations. However, the present invention is not limited thereto. For example, organic anions and cations may also be detected in addition to the inorganic anions and cations.

The metal component analyzer 160 may perform metal component analysis by inductively coupled plasma (ICP) spectroscopy. The metal component analyzer 160 may include a nebulizer, a spray chamber, a plasma torch and a detector. After a sample is delivered to the nebulizer through the second sample analysis line 139b and converted into a polydisperse aerosol suitable for ionization in plasma by ICP spectrometry instrumentation, larger aerosol particles may be removed from the aerosol in the spray chamber, and then, the aerosol may be introduced into the plasma by the plasma torch assembly. The ICP spectroscopy may be an ICP-optical emission spectroscopy (ICP-OES). The plasma may excite atoms and ions to emit light at particular wavelengths, which correspond to different metal elements in the sample, and the emitted light may then be detected by the detector of the metal component analyzer 160. The intensity of the emission may correspond to the concentration of the metal element detected. Alternatively, The ICP spectroscopy may be an ICP-mass spectroscopy (ICP-MS).

Hereinafter, an operation of the dual sample loop type sample injector 130 will be explained.

FIGS. 9A to 9G are views illustrating a movement path of an inspection target sample according to an operation of the switching valve 134 of the sample injector 130.

Figure 9A:
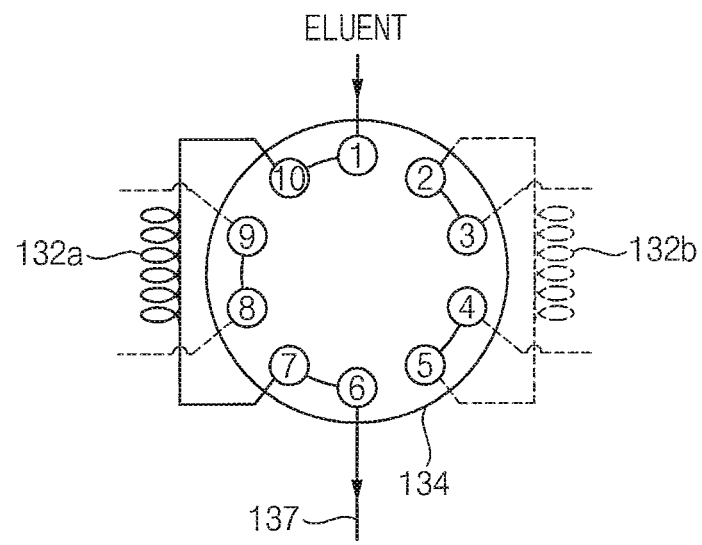
FIGS. 9A to 9G are views illustrating a movement path of an inspection target sample according to an operation of the switching valve of the sample injector.

Referring to FIG. 9A, the switching valve 134 may have a first position as a measurement standby state. In the first position, the first port and the tenth port are connected to each other and the seventh port and the sixth port are connected to each other so that the eluent may be supplied to the analyzer 140 through the eluent supply line 135, the first sample loop 132a and the sample analysis line 137. In this state, the first sample loop 132a and the second sample loop 132b may not be filled with the inspection target sample IS.

Figure 9B:
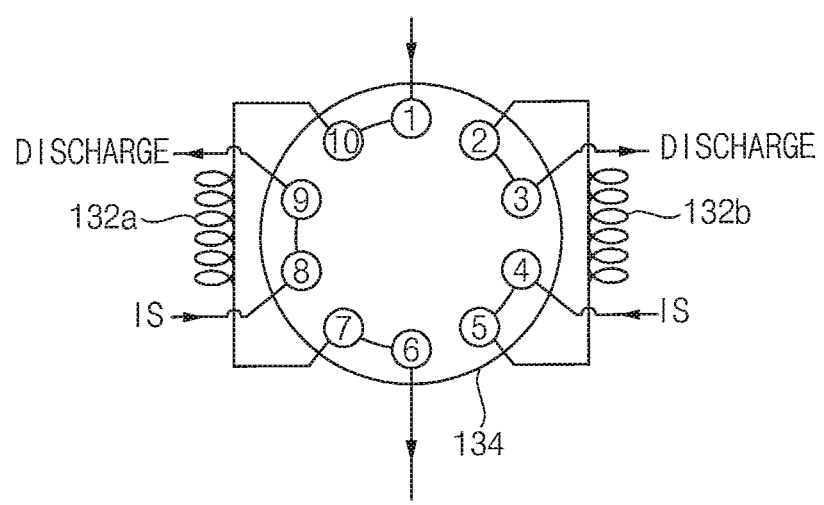
Figure 9C:
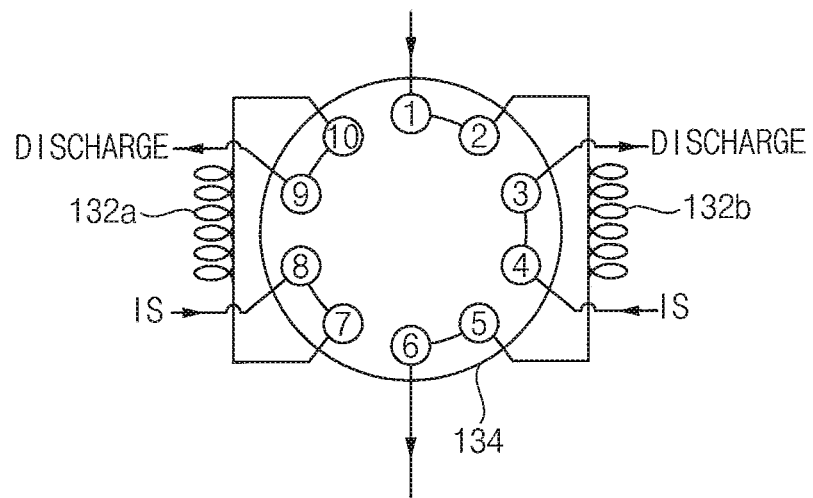
Figure 9D:
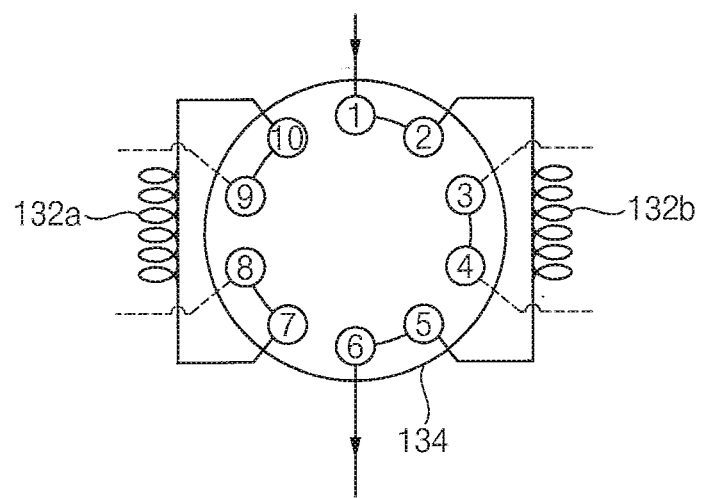

Referring to FIGS. 9B to 9D, the first and second sample loops 132a and 132b may be filled with the inspection target sample IS, and the second inspection target sample IS #2 filled in the second sample loop 132b may be supplied to the ion component analyzer 150 and the metal component analyzer 160 of the analyzer 140 to perform the component analysis, and the first inspection target sample IS #1 filled in the first sample loop 132*a* is not discharged to the outside and may be kept inside.

As illustrated in FIG. 9B, in the first position of the switching valve 134, the syringe pump 124 may be turned on and the second sample loop 132*b* may be connected to the second sample supply line 129*b* such that the second sample loop 132*b* is filled with the inspection target sample IS. In this case, the fourth port and the fifth port may be connected to each other so that the second inspection target sample IS (i.e., IS #2) supplied from the second sample supply line 129*b* may fill the second sample loop 132*b*. At this time, the eluent may be supplied to the analyzer 140 through the eluent supply line 135, the first sample loop 132*a* and the sample analysis line 137, and the eighth port and the ninth port may be connected to each other so that the first inspection target sample IS (i.e., IS #1) supplied from the first sample supply line 129*a* is discharged to the outside through the first sample drain line 136*a*, and the first sample loop 132*a* may not be filled with the inspection target sample IS.

As illustrated in FIG. 9C, the switching valve 134 may be switched to a second position, the first port and the second port may be connected to each other and the fifth port and the sixth port may be connected to each other so that the second inspection target sample IS #2 filled in the second sample loop 132*b* is supplied to the analyzer 140 through the sample analysis line 137 together with the eluent, to perform the component analysis. At this time, the first sample loop 132*a* may be connected to the first sample supply line 129*a* so that the first sample loop 132*a* is filled with the first inspection target sample IS (i.e., IS #1), and the third port and the fourth port may be connected to each other so that the inspection target sample IS supplied from the second sample supply line 129*b* is discharged to the outside through the second sample drain line 136*b*. In this case, the seventh port and the eighth port may be connected to each other so that the first inspection target sample IS (i.e., IS #1) supplied from the first sample supply line 129*a* may fill the first sample loop 132*a*.

As illustrated in FIG. 9D, while the second inspection target sample IS #2 is supplied to the analyzer 140 together with the eluent to perform the component analysis, the syringe pump 124 may be turned off so that the supply of the inspection target sample IS to the first sample loop 132*a* is stopped and the first inspection target sample IS #1, which includes a material the same as that of the second inspection target sample IS #2, may be maintained in the first sample loop 132*a*.

Figure 9E:
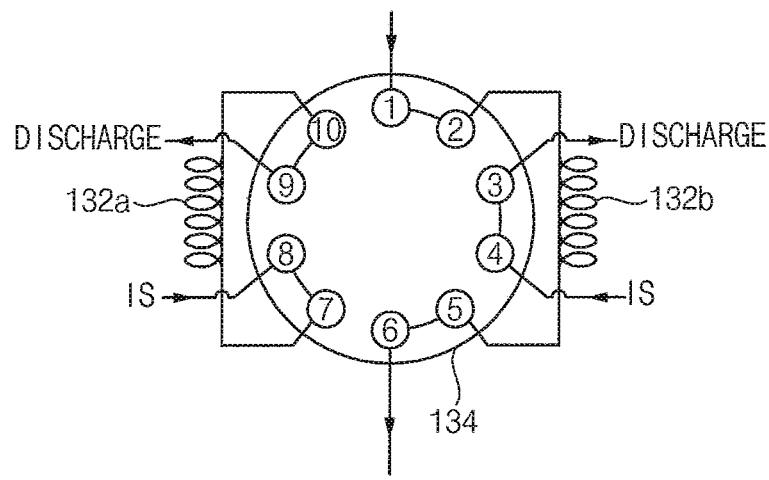

Referring to FIG. 9E, as a result of the component analysis of the second inspection target sample IS #2 of FIG. 9D, when the measured concentration value is within the allowable range, the first inspection target sample IS #1 filled in the first sample loop 132*a* may be discharged to the outside, and the first sample loop 132*a* may be filled with a new inspection target sample IS.

Figure 9F:
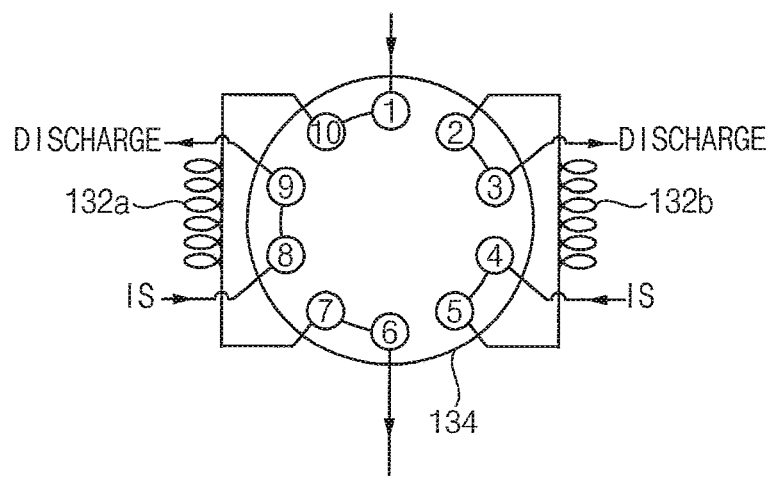

Referring to FIG. 9F, the switching valve 134 may be switched to the first position, and the first inspection target sample IS #1 filled in the first sample loop 132*a* may be supplied to the analyzer 140 through the sample analysis line 137 together with the eluent to perform component analysis. In this case, the second sample loop 132*b* may be connected to the second sample supply line 129*b* so that the second sample loop 132*b* is filled with the inspection target sample IS.

While the first inspection target sample IS #1 is supplied to the analyzer 140 together with the eluent to perform the component analysis, the syringe pump 124 may be turned off to stop the supply of the inspection target sample IS to the second sample loop 132*b*, and the second inspection target sample IS #2, which includes a material the same as that of the first inspection target sample IS #1, may be maintained in the second sample loop 132*b*.

Figure 9G:
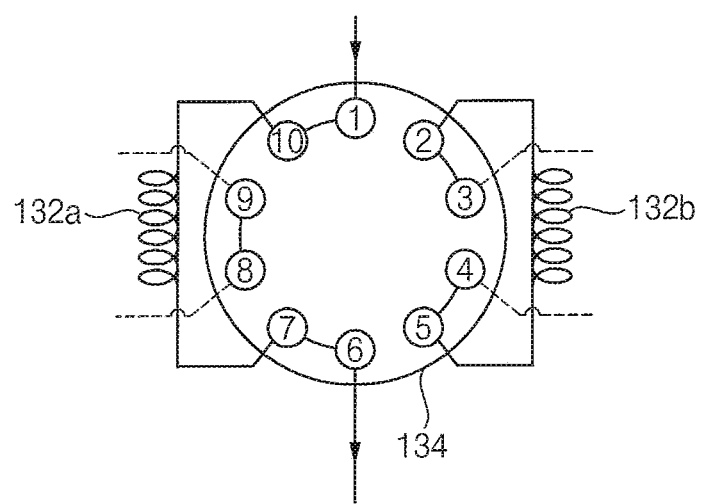

Referring to FIG. 9G, as a result of the component analysis of the second inspection target sample IS #2 of FIG. 9D, when the measured concentration value is out of the allowable range, the switching valve 134 may be switched to the first position, and the first inspection target sample IS #1 waiting in the first sample loop 132*a* may be supplied to the analyzer 140 through the sample analysis line 137 together with the eluent, so that the component analysis can be performed again. In this case, the second sample loop 132*b* may not be filled with the inspection target sample.

As such, when the analysis result value for the second inspection target sample IS #2 is out of the allowable range, the component analysis may be performed again on the first inspection target sample IS #1, which includes a material the same as that of the second inspection target sample IS #2, to determine whether the data obtained in the first analysis is false data due to an analysis facility error. Accordingly, it is possible to re-verify the hunting property data of the real-time analysis facility through the dual sample loop type sample injector 130. Through this consistency check, the reliability of analysis data can be enhanced prior to data interpretation for sample analysis.

Hereinafter, a water quality monitoring system will be explained.

Figure 10:
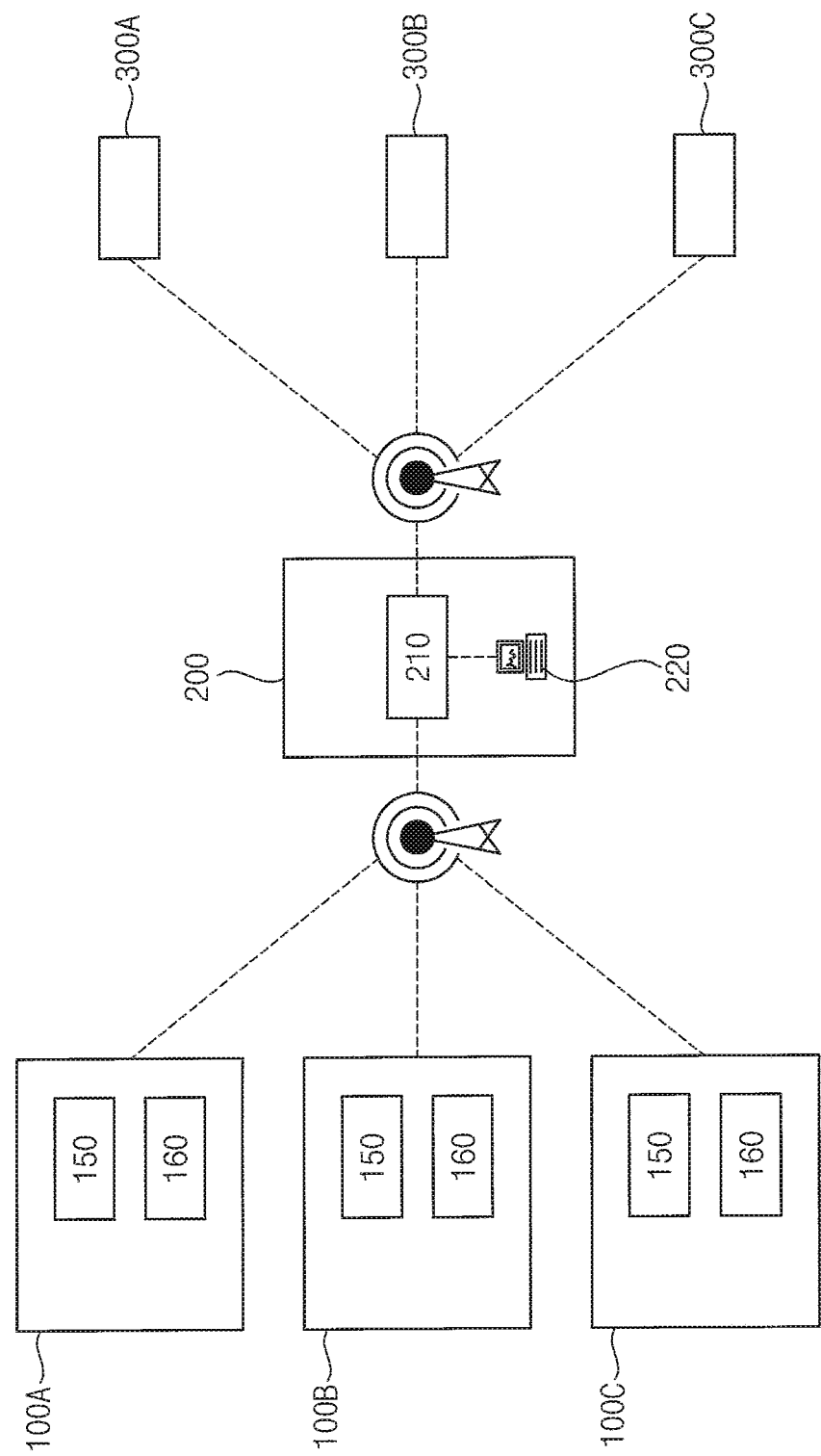
FIG. 10 is a block diagram illustrating a real-time water quality monitoring system in accordance with an example embodiment of the present invention.

FIG. 10 is a block diagram illustrating a real-time water quality monitoring system in accordance with an example embodiment of the present invention.

Referring to FIGS. 1 and 10, a real-time water quality monitoring system 10 may include contaminant analysis apparatuses 100A, 100B and 100C configured to analyze contaminants in effluent water discharged through discharge pipes 30 of a plurality of wastewater treatment facilities 22A, 22B and 22C, respectively, discharge rate sensors 300A, 300B and 300C installed in the discharge pipes 30, respectively, and an integrated monitoring apparatus 200 configured to receive measurement result values from the contaminant analysis apparatuses 100A, 100B and 100C and the discharge rate sensors 300A, 300B and 300C and monitor in real time concentration of the contaminant in the total effluent water that is purified and discharged from wastewater generated in semiconductor manufacturing lines 20A, 20B and 20C. The integrated monitoring apparatus 200 may include the server 210 and the monitoring portion 220.

In an example embodiment of the present invention, the first contaminant analysis apparatus 100A may include an ion component analyzer 150 and a metal component analyzer 160 to respectively detect an ion component and a metal component of the contaminant included in the effluent water discharged through the discharge pipe 30 of the first wastewater treatment facility 22A. The second contaminant analysis apparatus 100B may include an ion component analyzer 150 and a metal component analyzer 160 to respectively detect an ion component and a metal component of the contaminant included in the effluent water discharged through the discharge pipe 30 of the second wastewater treatment facility 22B. The third contaminant analysis apparatus 100C may include an ion component analyzer 150 and a metal component analyzer 160 to respectively detect an ion component and a metal component of the contaminant included in the effluent water discharged through the discharge pipe 30 of the third wastewater treatment facility 22C.

The first discharge rate sensor 300A may measure a flow rate Qa of the effluent water discharged through the discharge pipe 30 of the first wastewater treatment facility 22A. The second discharge rate sensor 300B may measure a flow rate Qb of the effluent water discharged through the discharge pipe 30 of the second wastewater treatment facility 22B. The third discharge rate sensor 300C may measure a flow rate Qc of the effluent water discharged through the discharge pipe 30 of the third wastewater treatment facility 22C.

The server 210 may receive and store the result values (sample concentration values) measured by the ion component analyzer 150 and the metal component analyzer 160 of each of the first to third contaminant analysis apparatuses 100A, 100B and 100C through a wireless communication network. The server 210 may receive and store the result values (flow values) measured by the first to third discharge rate sensors 300A, 300B and 300C through a wireless communication network. For example, the wireless communication network may use wireless communication technology such as, for example, a wireless local area network (WLAN), a wireless-fidelity (Wi-Fi), a wireless fidelity (Wi-Fi) Direct, a Digital Living Network Alliance (DLNA), a Wireless Broadband (WiBro), or a World Interoperability For Microwave Access (WiMAX) such as, for example, High Speed Downlink Packet Access (HSDPA), High Speed Uplink Packet Access (HSUPA), Long Term Evolution (LTE), Long Term Evolution-Advanced (LTE-A), $5^{th}$ generation (5G) of cellular technology, etc.

The monitoring portion 220 may calculate the concentration of the contaminant in the total effluent water that is purified and discharged from the wastewater generated in the semiconductor manufacturing lines 20A, 20B and 20C based on the result values stored in the server 210. The monitoring portion 220 may display the calculated concentration in real time through a display device. The monitoring portion 220 may convert the calculated concentration value into a graph of concentration change over time and display it. Through real time monitoring, the real-time water quality monitoring system 10 of the present invention may detect and prevent fault, correct an analysis facility error, and/or be capable of rapidly responding to unusual incidents.

As mentioned above, the contaminant analysis apparatuses 100A, 100B and 100C may each include the multi-stage filtering pre-processing sampler 110 configured to remove suspended substances in the effluent water discharged from the corresponding one(s) of the semiconductor manufacturing lines 20A, 20B and 20C to provide the inspection target sample, the sample introducer 120 configured to selectively supply the inspection target sample filtered by the pre-processing sampler 110 and the reference sample from the reference sample supply 400, the sample injector 130 configured to selectively supply the inspection target sample and the reference sample supplied from the sample introducer 120 to the sample analysis line 137, and the analyzer 140 having the ion component analyzer 150 as the first analyzer for detecting an ion component of the sample supplied through the sample analysis line 137 and the metal component analyzer 160 as the second analyzer for detecting a metal component of the sample.

The pre-processing sampler 110 may remove suspended substances in the effluent water discharged from the semiconductor manufacturing lines 20A, 20B and 20C, prevent clogging in the analysis device through filtering suitable for analysis equipment, and reduce the maintenance cost of the sample pipe. For example, by installing multiple stages of filtration, such as from coarse to fine, in the pre-processing sampler 110, it may increase the efficacy of removing particles and avoid clogging in the analysis device. Hunting data of the real-time analysis facility may be re-verified through the dual sample loop type sample injector 130. Through this consistency check, the reliability of analysis data can be enhanced prior to data interpretation for sample analysis.

Further, each of the contaminant analysis apparatuses 100A, 100B and 100C may simultaneously analyze the ion component and the metal component of the contaminant contained in the effluent water, thereby promoting space efficiency and operational efficiency.

Furthermore, the real-time water quality monitoring system 10 may receive the measurement result values from the contaminant analysis apparatuses 100A, 100B and 100C and the discharge rate sensors 300A, 300B and 300C using a wireless communication network to measure the concentration of contaminants in the total effluent water discharged from the semiconductor manufacturing lines 20A, 20B and 20C in real time. Accordingly, the real-time water quality monitoring system 10 of the present invention may detect and prevent fault, correct an analysis facility error, and/or be capable of rapidly responding to unusual incidents.

The semiconductor devices manufactured by the above semiconductor manufacturing lines 20A, 20B and 20C may include, for example, logic devices and/or memory devices. A semiconductor package may include the semiconductor devices manufactured by the above semiconductor manufacturing lines 20A, 20B and 20C. For example, the semiconductor package may include logic devices such as, for example, central processing units (CPUs), main processing units (MPUs), application processors (APs), or the like, volatile memory devices such as, for example, dynamic random access memory (DRAM) devices, high bandwidth memory (HBM) devices, and/or non-volatile memory devices such as, for example, flash memory devices, phase-change RAM (PRAM) devices, magnetic RAM (MRAM) devices, resistive RAM (ReRAM) devices, or the like.

The foregoing is illustrative of example embodiments of the present invention and is not to be construed as limiting thereof. Although a few example embodiments of the present invention have been described, those skilled in the art will readily appreciate that many modifications and variations are possible in the example embodiments without departing from the spirit and scope of the present invention as defined in the appended claims.

What is claimed is:

1. A real-time wastewater treatment and water quality monitoring system, comprising:
    a plurality of wastewater treatment facilities configured to purify wastewater generated from semiconductor manufacturing lines;
    a plurality of contaminant analysis apparatuses configured to obtain and analyze a sample from effluent water discharged through discharge pipes of the wastewater treatment facilities respectively;
    discharge rate sensors installed in the discharge pipes respectively; and
    an integrated monitoring apparatus configured to receive measurement result values from the contaminant analysis apparatuses and the discharge rate sensors and monitor in real time concentration of a contaminant in an entirety of the effluent water that is purified and discharged from the wastewater generated in the semiconductor manufacturing lines.

2. The real-time wastewater treatment and water quality monitoring system of claim 1, wherein each of the wastewater treatment facilities purifies the wastewater by an inorganic treatment process and an organic treatment process.

3. The real-time wastewater treatment and water quality monitoring system of claim 1, wherein the wastewater generated in each of the semiconductor manufacturing lines is supplied to at least one of the plurality of wastewater treatment facilities.

4. The real-time wastewater treatment and water quality monitoring system of claim 1, wherein each of the contaminant analysis apparatuses comprises:
a pre-processing sampler configured to collect and filter the effluent water discharged through a corresponding one of the discharge pipes to provide an inspection target sample;
a sample introducer configured to selectively introduce the inspection target sample from the pre-processing sampler and a reference sample from a reference sample supply to a sample line;
a sample injector configured to selectively supply the inspection target sample and the reference sample supplied through the sample line to a sample analysis line; and
an analyzer having an ion component analyzer and a metal component analyzer configured to respectively analyze an ion component and a metal component of the inspection target sample and the reference sample supplied through the sample analysis line.

5. The real-time wastewater treatment and water quality monitoring system of claim 4, wherein the pre-processing sampler includes a sampling box having a first filter for removing a suspended material in the effluent water.

6. The real-time wastewater treatment and water quality monitoring system of claim 5, wherein the pre-processing sampler further includes a second filter that is installed in a sampling port line extending from the sampling box to secondarily filter the inspection target sample.

7. The real-time wastewater treatment and water quality monitoring system of claim 4, wherein the sample injector includes first and second sample loops configured to be filled with any one of the inspection target sample and the reference sample and a switching valve configured to connect any one of the first and second sample loops to the sample analysis line and disconnect an other of the first and second sample loops from the sample analysis line.

8. The real-time wastewater treatment and water quality monitoring system of claim 7, wherein when a first inspection target sample filled in the any one of the first and second sample loops is moved to the analyzer to perform component analysis, a second inspection target sample filled in the other of the first and second sample loops is retained therein.

9. The real-time wastewater treatment and water quality monitoring system of claim 8, wherein as a result of the component analysis of the first inspection target sample, when measurement value is out of an allowable range, the second inspection target sample is moved to the analyzer through the sample analysis line to perform the component analysis again.

10. The real-time wastewater treatment and water quality monitoring system of claim 1, wherein the integrated monitoring apparatus comprises:

a server configured to receive the result values measured by the contaminant analysis apparatuses and the discharge rate sensors through a wireless communication network; and
a monitoring portion configured to calculate the concentration of the contaminant in the entirety of the effluent water discharged from the semiconductor manufacturing lines based on the result values stored in the server.

11. A contaminant analysis apparatus, comprising:
a pre-processing sampler configured to collect and filter effluent water discharged through a discharge pipe of a wastewater treatment facility to provide an inspection target sample;
a sample introducer having a sample supply valve configured to selectively introduce the inspection target sample from the pre-processing sampler and a reference sample from a reference sample supply;
a sample injector configured to selectively supply the inspection target sample and the reference sample supplied from the sample introducer to a sample analysis line, and including first and second sample loops configured to be filled with the inspection target sample and a switching valve configured to connect any one of the first and second sample loops to the sample analysis line and disconnect an other of the first and second sample loops from the sample analysis line; and
an analyzer having an ion component analyzer and a metal component analyzer configured to respectively analyze an ion component and a metal component of the inspection target sample and the reference sample supplied through the sample analysis line.

12. The contaminant analysis apparatus of claim 11, wherein the pre-processing sampler includes a sampling box having a first filter for removing a suspended material in the effluent water.

13. The contaminant analysis apparatus of claim 12, wherein the sampling box includes a stirrer that is provided in the sampling box to circulate the effluent water in the sampling box.

14. The contaminant analysis apparatus of claim 12, wherein the pre-processing sampler further includes a second filter that is installed in a sampling port line extending from the sampling box to secondarily filter the inspection target sample.

15. The contaminant analysis apparatus of claim 11, wherein when a first inspection target sample filled in the any one of the first and second sample loops is moved to the analyzer to perform component analysis, a second inspection target sample filled in the other of the first and second sample loops is retained therein.

16. The contaminant analysis apparatus of claim 15, wherein the first and second inspection target samples include a same material.

17. The contaminant analysis apparatus of claim 15, wherein as a result of the component analysis of the first inspection target sample, when measurement value is out of an allowable range, the second inspection target sample is moved to the analyzer to perform the component analysis again.

18. The contaminant analysis apparatus of claim 17, wherein when the component analysis is performed on the second inspection target sample, the any one of the first and second sample loops is not filled with a new inspection target sample.

19. The contaminant analysis apparatus of claim 15, wherein as a result of the component analysis of the first inspection target sample, when measurement value is within an allowable range, the second inspection target sample is discharged to outside and the first and second sample loops are each filled with a new inspection target sample.

20. The contaminant analysis apparatus of claim 11, wherein the ion component analyzer performs ion component analysis by an ion chromatography technique, and the metal component analyzer performs metal component analysis by inductively coupled plasma (ICP) spectroscopy.

* * * * *